(12) United States Patent
Cheng (10) Patent No.: US 7,375,478 B2
(45) Date of Patent: May 20, 2008

(54) SERVO DRIVE WITH HIGH SPEED WRAPPING FUNCTION

(75) Inventor: T. S. Cheng, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 319 days.

(21) Appl. No.: 11/313,916

(22) Filed: Dec. 22, 2005

(65) Prior Publication Data

US 2007/0176571 A1 Aug. 2, 2007

(51) Int. Cl.
*F04D 15/00* (2006.01)

(52) U.S. Cl. ............... 318/3; 318/6; 318/11; 318/638; 242/478

(58) Field of Classification Search .............. 318/3, 318/6, 9, 11, 638; 242/478, 478.2
See application file for complete search history.

(56) References Cited

U.S. PATENT DOCUMENTS 4,022,391 A * 5/1977 Stein et al. ............ 242/478.2
4,244,539 A * 1/1981 Taneda et al. ........... 242/478.1
5,058,818 A * 10/1991 Haehnel et al. ......... 242/472.8
5,499,775 A * 3/1996 Vander Groef .......... 242/476.7
5,803,394 A * 9/1998 Kotzur et al. ............ 242/483.8

* cited by examiner

*Primary Examiner*—Rina I Duda (57) ABSTRACT

A servo drive with high speed wrapping function is applied for servo control of wrapping wire and method for the same. The servo drive includes a wrapping mechanism, a rotation control unit for controlling rotation of the wrapping mechanism, a lateral motion control unit for controlling lateral movement of the wrapping mechanism, a potentiometer, and an upper-layer controller. The lateral motion control unit of the servo drive cooperates with a command processor such that an inverter command of an inverter is calculated by wrapping parameter, external activating signal and a thickness detection signal. The induction motor is activated to drive the wrapping mechanism and an encoder linked with the induction motor moves the wrapping mechanism for lateral movement such that the wire is guided between two ends of wrapping cylinder.

13 Claims, 13 Drawing Sheets

SERVO DRIVE WITH HIGH SPEED WRAPPING FUNCTION

BACKGROUND OF THE INVENTION

1. Field of the Invention

The present invention relates to a servo drive with high speed wrapping function, especially to a servo drive with high speed wrap, parameter-defined wrap pattern and wire-speed control and controlling method for the same.

2. Description of Prior Art

The controller for wrapping mechanism such as cotton spin cylinder generally uses inverter control architecture. The prior art controller for wrapping mechanism comprises a set of inverter, induction motor and a mechanical transmission device. The induction motor uses the driving control of inverter to provide rotation force for the wrapping mechanism. The lateral movement for the reciprocating operation of the wrapping mechanism is provided by the mechanical transmission device. However, the prior art controller for wrapping mechanism has following drawbacks:

1. The lateral movement is achieved by mechanical transmission and high speed wrapping cannot realize because the mechanical response is limited.

2. The wrapping way has fixed pattern and can not adjusted by parameter. The mechanical structure needs adjustment when other wrapping pattern is required, which is cumbersome.

Figure 1:
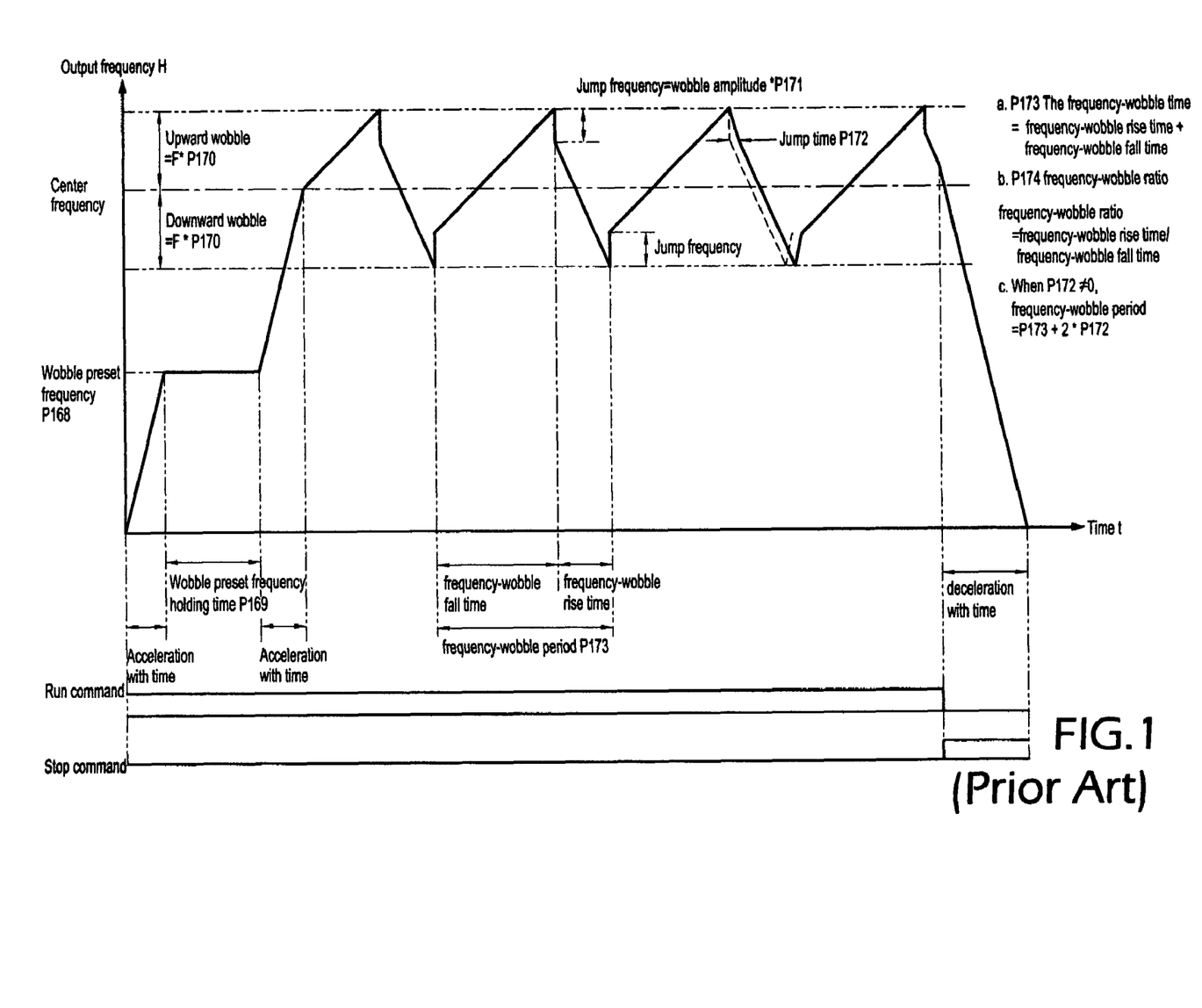
FIG. 1 shows the frequency wobbling function by the controller for wrapping mechanism.

To overcome the above-mentioned limitation on lateral movement, a set of inverter used with inductor motor is proposed. FIG. 1 shows the frequency wobbling function by the controller for wrapping mechanism. The inverter sets the initial frequency, final frequency and wrapping time parameters. When the inverter receives a running command, a set acceleration time and a holding time for preset wobble frequency is elapsed such that the inverter achieves the central frequency F for wrapping operation. By using the initial frequency and final frequency to set up upper and down wobble frequency, the frequency-wobble time, the frequency-wobble ratio and the jumping frequency are output with respect to time t, whereby the mechanical transmission device is driven by the inductor motor for lateral movement.

The frequency-wobble time=frequency-wobble rise time+frequency-wobble fall time.

The frequency-wobble ratio=frequency-wobble rise time/frequency-wobble fall time.

The jumping frequency=frequency-wobble amplitude×jumping time.

When jumping time≠0, the frequency-wobble period=frequency-wobble time+2×jumping time.

When the inverter receives a stop command, the inverter is decelerated according to a preset deceleration time. The above-mentioned inverter used with inductor motor can provide lateral movement control for wrapping mechanism. However, the actual lateral movement control for wrapping mechanism needs the help of mechanical device for the forward and reverse operation. When the hardware is fixed, the wrapping length is also fixed and the parameter adjustment needs to take hardware into account and the wire speed control is not provided for rotation shaft.

SUMMARY OF THE INVENTION

The present invention is to provide a servo drive with high speed wrapping function, which uses digital input signal of optical sensor, wrap start and stop signals, wrap thickness analog input signal and pulse input signal. The servo drive further uses wrap command processor built in the servo drive and wrap pattern parameters and voltage signal for wrap thickness detected by a potentiometer and pulse command of servo motor to move laterally a wrapping mechanism to guide the wire between two ends of a rolling cylinder. High speed and versatile wrap can be achieved by parameter setting and software computation. The hardware of wrapping mechanism can be simplified and the wrapping mechanism can be operated at high speed.

Accordingly, the present invention provides a servo drive with high speed wrapping function, which comprises at least one wrapping mechanism, a rotation control unit for controlling rotation of the wrapping mechanism, an induction motor connected to the wrapping mechanism, an encoder arranged on the induction motor, a lateral motion control unit for controlling lateral reciprocating movement of the wrapping mechanism, a potentiometer connected to the wrapping mechanism for detecting wrap thickness and outputting a detection voltage signal as one input signal to the servo drive and an upper-layer controller connected to the rotation control unit and the lateral motion control unit through interfaces such as RS232 and RS485. The lateral motion control unit comprises a servo motor and a servo drive for driving the servo motor and having built-in wrap command processor and software program. The upper-layer controller is used set control parameter and target, display control result and coordinate the operation and order of the servo drive.

Accordingly, the present invention provides a method for driving servo drive with high speed wrapping function, comprising a parameter setting step, where the function parameters are set according to wrap pattern; an initial origin return step, where the servo drive receives an external activation signal and uses with the origin detector to detect wrap origin, a wrap origin return is performed to enter wrap function; a wrap thickness calculation step, the servo drive reads the thickness detection voltage signal from the potentiometer to calculate the wrap thickness and wire speed control in wrap duration; a rotation control step for wrapping mechanism, the servo drive calculate an inverter command based on above set parameters, wrap thickness and wire speed command, the inverter command is output to the inverter, whereby the inverter controls the induction motor to drive the wrapping mechanism; a lateral movement control step for wrap mechanism, where the encoder generates a series of pulse signals to the wrapping command processor according to the rotation of the induction motor, the series of pulse signals used with the wrap parameters for pulse command calculation of the servo motor and the wrap positioning control, the servo motor having forward and backward rotation to move the wrapping mechanism between two ends of the cylinder; and a wrap stopping step, where the servo drive receives an external close signal (WSTOP) to stop the rotation control unit and the lateral motion control unit.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 2:
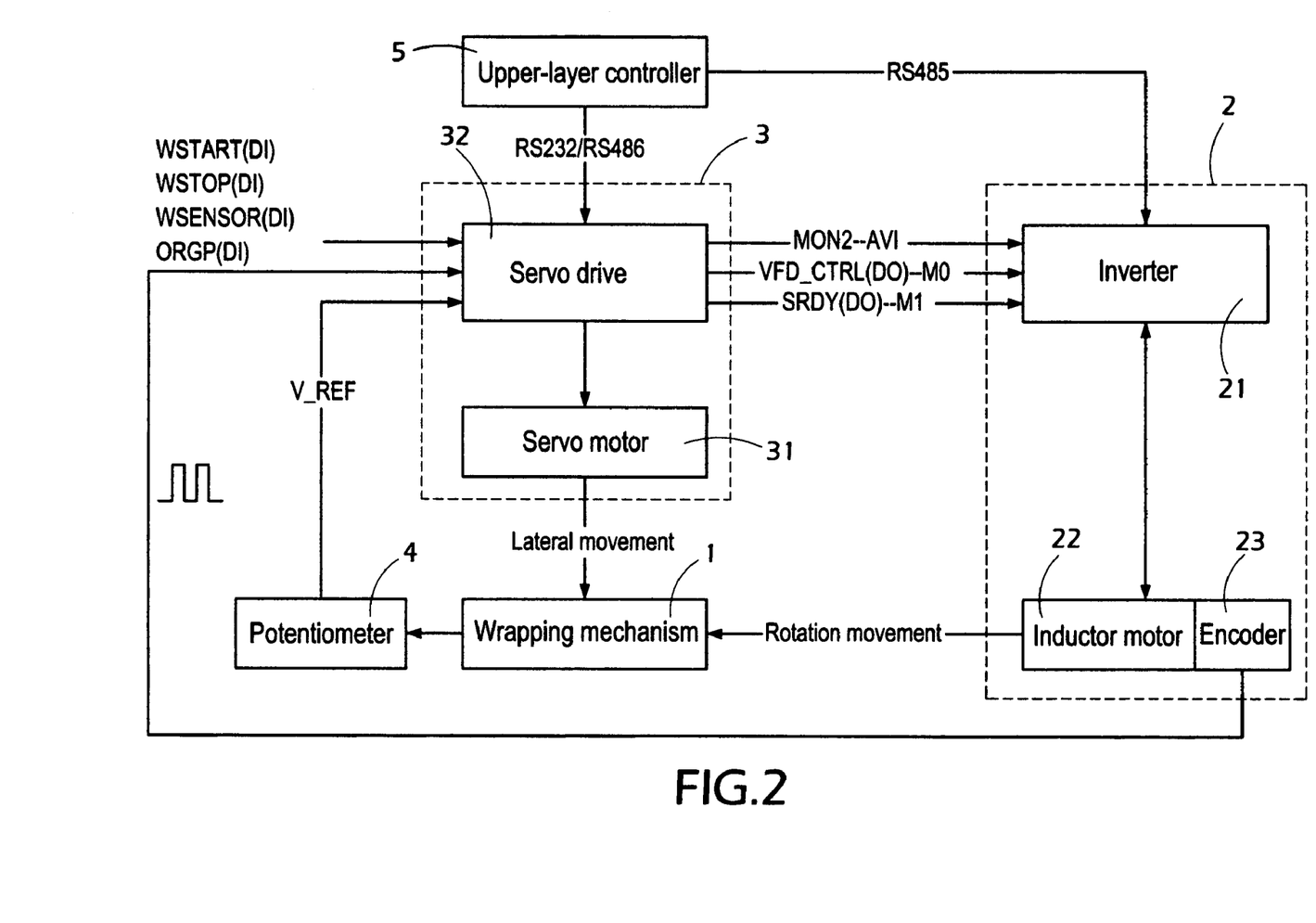
FIG. 2 shows the block diagram of the servo drive with high speed wrapping function according to the present invention.
Figure 3:
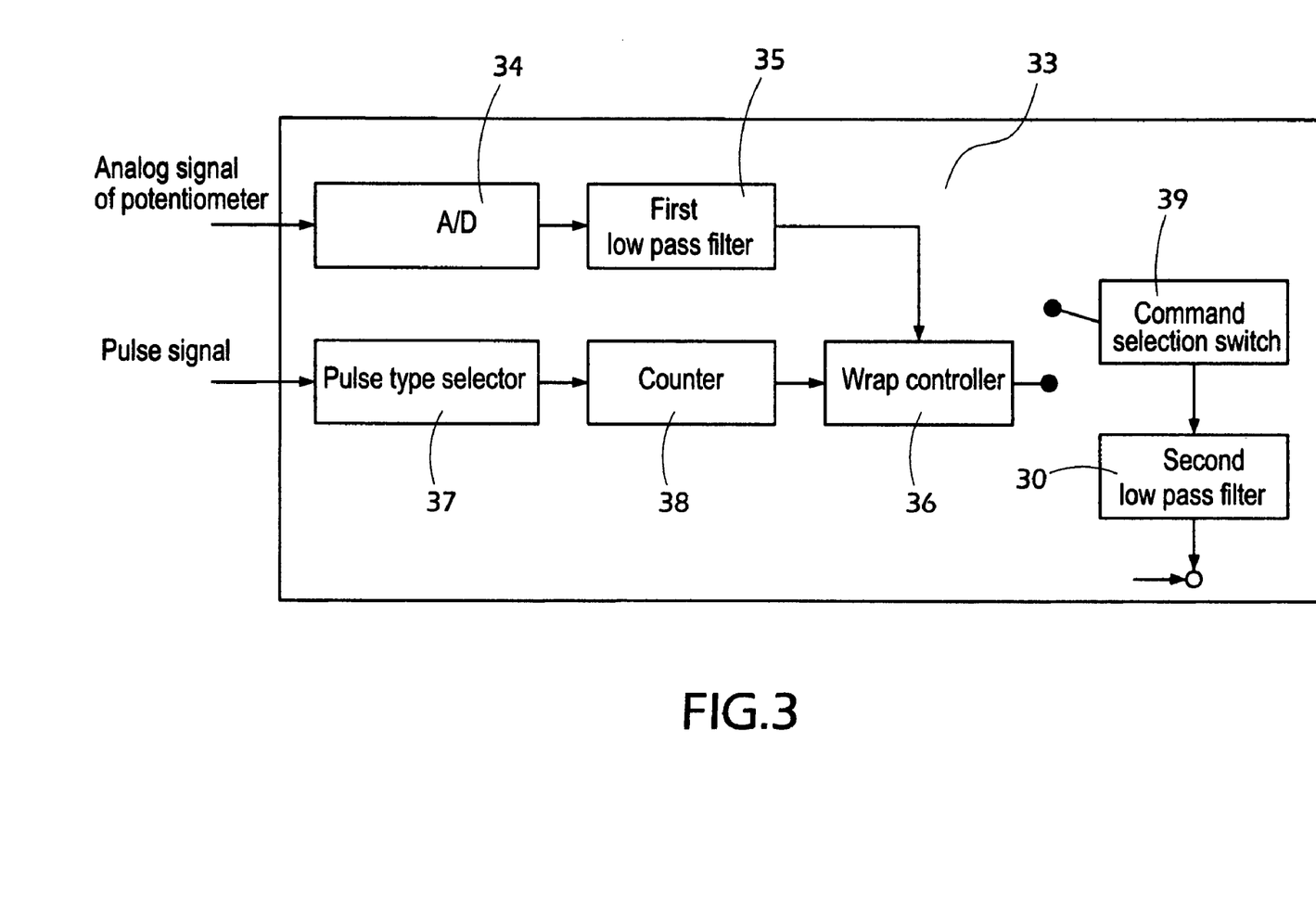
FIG. 3 shows the block diagram of the wrap command processor according to the present invention.

With reference to FIGS. 2 and 3, the servo drive with high speed wrapping function comprises a wrapping mechanism 1, a rotation control unit 2 for controlling rotation of the wrapping mechanism 1, a lateral motion control unit 3 for controlling lateral reciprocating movement of the wrapping mechanism 1, a potentiometer 4, and an upper-layer controller 5. The servo drive with high speed wrapping function provides wrapping mode and wire speed control by parameter setting.

The wrapping mechanism 1 comprises at least one cylinder unit, a rotation unit for wrapping operation and a lateral movement unit for unifying wrapping thickness. The above-mentioned units are ordinary to wrapping mechanism and are not shown in those figures.

The rotation control unit 2 comprises an inverter 21 and an inductor motor 22 driven by the inverter 21. The inductor motor 22 further comprises an encoder 23 to generate a series of pulse signals when the inductor motor 22 is driven and the pulse signals drive the lateral motion control unit 3. The inverter 21 drives the wrapping mechanism 1 for wrapping function by the external analog voltage input of the lateral motion control unit 3.

The activation of the inverter 21 can use the digital output terminal VFD_CTRL and SRDY of the servo drive 32 to output the external terminal of the inverter (from M0, M1), or use wired communication. The inverter command of the inverter 21 is the external analog voltage input of the servo drive 32.

The lateral motion control unit 3 comprises a servo motor 31 and a servo drive 32 for driving the servo motor 31. The servo drive 32 comprises a wrapping command processor 33 therein. The servo motor 31 is linked with the lateral movement unit of the wrapping mechanism 1. The output of the servo drive 32 is linked to the servo motor 31 for driving output and the input of the servo motor 31 receives external function signal such as activation signal WSTART(DI), stop signal WSTOP(DI) and sensor signal WSENSOR(DI), as well as the pulse signal output by the encoder 23, the V_REF analog speed signal input to the potentiometer 4 for thickness detection. The signals are processed by the wrapping command processor 33 and the software program to generate pulse command for servo motor. The pulse command for servo motor drives the servo motor 31 to forward and backward move the wrapping mechanism 1 in lateral movement and the wire is wrapped between two ends cylinder to and fro.

The wrapping command processor 33 comprises a signal converter 34 for receiving the voltage level analog signal of the potentiometer 4 and converts the analog signal into digital signal. The digital signal is sent to a wrap controller 36 through a first low pass filter 35 and a pulse type selector 37 for receiving pulse signal of the encoder 23. The output of the pulse type selector 37 is sent to the wrap controller 36 through a counter 38. The wrap controller 36 comprises a software program to calculate the pulse command of the servo motor 31 with reference to set parameters. The pulse command of the encoder 23 is processed by the wrap controller 36 and then output to the servo drive 32 through a command selection switch 39 and the second low pass filter 30.

The potentiometer 4 is connected to the wrapping mechanism 1 for wrap thickness measurement and the output voltage signal thereof is used as input signal of the servo drive 32 for wire speed control of wrapping process and wrapping angle. The potentiometer 4 and its function can be omitted when the no angle setting and no speed control function are needed during wrapping process.

The upper-layer controller 5 is connected to the rotation control unit 2 and the lateral motion control unit 3 through interfaces such as RS232 and RS485. The upper-layer controller 5 is a man-machine interface and used set control parameter and target, display control result and coordinate the operation and order of the servo drive with high speed wrapping function.

The servo drive with high speed wrapping function further comprises an origin detector and a broken-wire detector (not shown). The origin detector is used to detect wrap origin and the broken-wire detector is used to detect whether the wrap wire is broken and generates a drive signal when broken-wire is found such that the wrapping mechanism 1 is stopped. The signal WSENSOR(DI) generated by the origin detector and the broken-wire detector is output as one of input signals of the servo drive 32. The broken-wire detector and related function can be omitted when the broken-wire detection function is not necessary.

Figure 4:
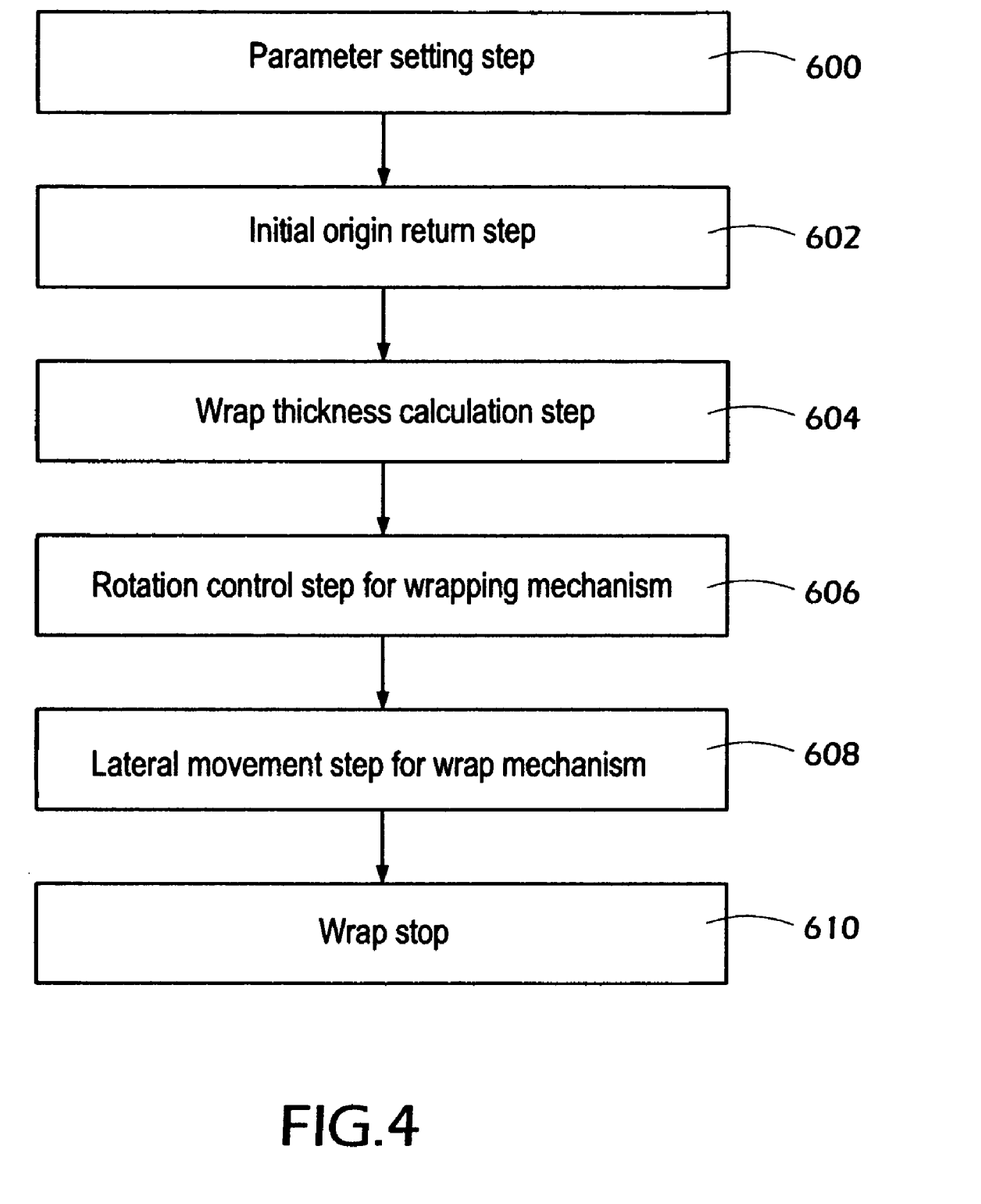
FIG. 4 shows the flowchart of the control method according to a preferred embodiment of the present invention.
Figure 5:
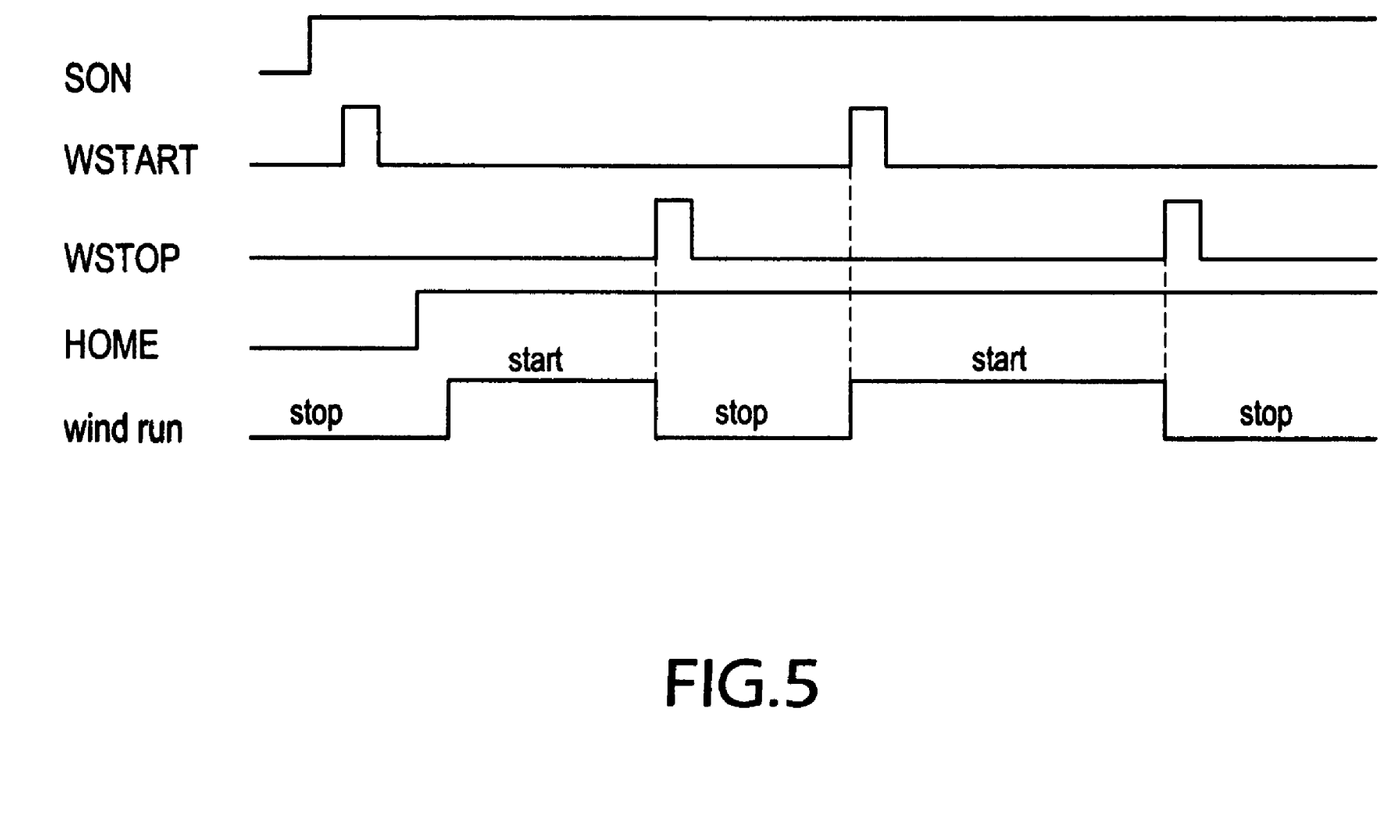
FIG. 5 shows a timing diagram according to a preferred embodiment of the present invention.
Figure 6:
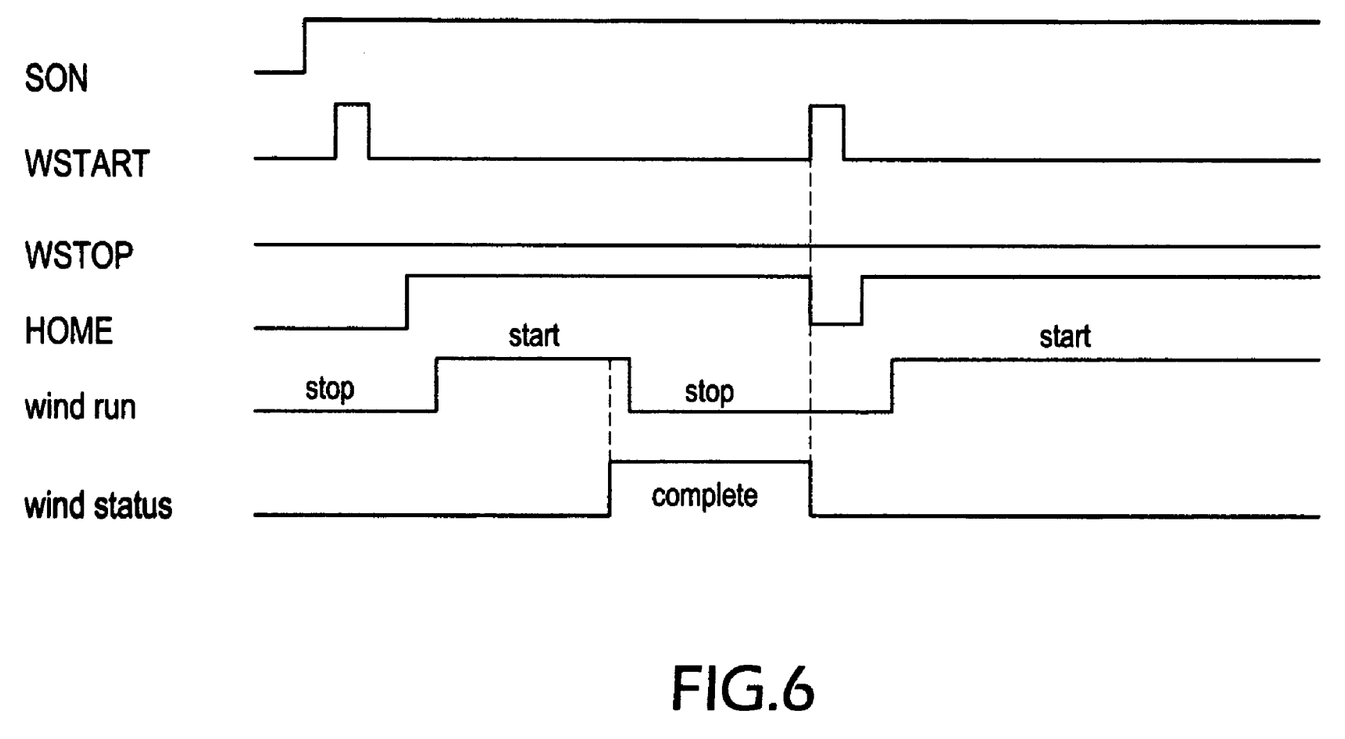
FIG. 6 shows another timing diagram according to a preferred embodiment of the present invention.
Figure 7:
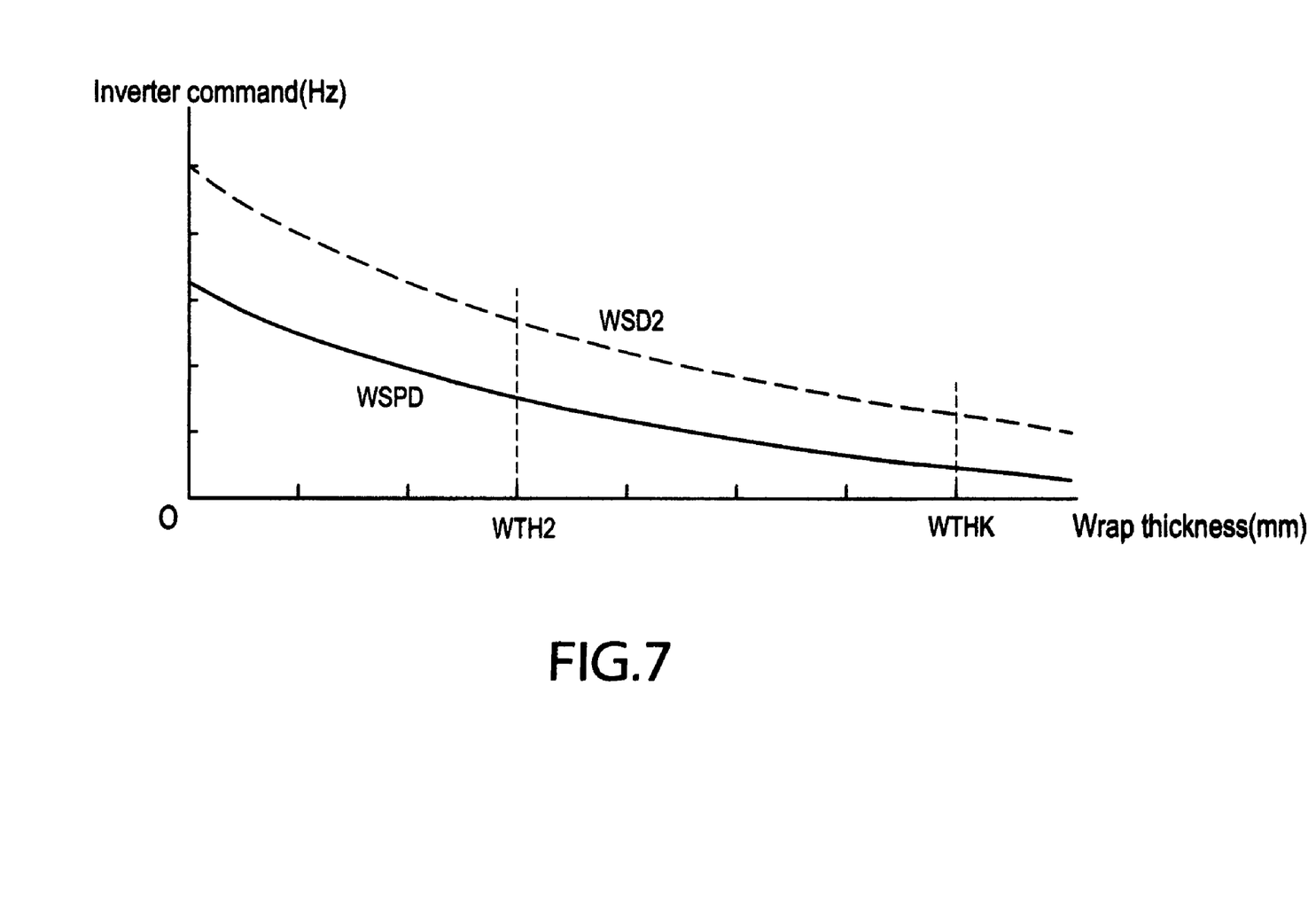
FIG. 7 shows the curve of wrap wire speed command.

With reference to FIGS. 4, 5 and 6, the servo drive with high speed wrapping function according to the present invention performs high-speed wrap, parameter-set wrap pattern and wire-speed control. The control step for the servo drive with high speed wrapping function according to the present invention are stated as follows:

a parameter setting step as shown in step 600, where the function parameters are set according to wrap pattern;

an initial origin return step as shown in step 602, where the servo drive receives an external activation signal WSTART and uses with the origin detector to detect wrap origin, a wrap origin return is performed to enter wrap function;

a wrap thickness calculation step as shown in step 604, the servo drive 32 reads the thickness detection voltage signal from the potentiometer 4 to calculate the wrap thickness and wire speed control in wrap duration;

a rotation control step for wrapping mechanism as shown in step 606, the servo drive 32 calculate an inverter command based on above set parameters, wrap thickness and wire speed command, the inverter command is output to the AVI analog input terminal of the inverter through the rotation speed command analog output MON2, whereby the inverter 21 controls the induction motor 22 to drive the wrapping mechanism to activate the operation of the rotation unit for wrapping operation;

a lateral movement for wrap mechanism as shown in step 608, where the encoder 23 generates a series of pulse signals to the wrapping command processor 33 according to the rotation of the induction motor 22, the series of pulse signals are used with the wrap parameters, the detection signals WSENSOR(DI) of the broken-wire detector, the thickness detection result V_REF of the potentiometer 4 for pulse command calculation of the servo motor 31 and the wrap positioning control, the servo motor 31 has forward and backward rotation to move the wrapping mechanism 1 to move the lateral movement unit for unifying wrapping thickness between two ends of the cylinder, the rotation speed of the inverter is controlled according to a thickness detection signal of the potentiometer 4 to maintain a wrap operation of constant wire speed;

The controlling method for the servo drive with high speed wrapping function according to the present invention provides two-stage wrap wire speed command setting. FIG. 7 shows the relationship between wrap thickness and inverter command, where WSPD is the wrap wire speed command for the first stage, WSD 2 is the wrap wire speed command for the second stage, WTHK is the wrap stop thickness and WTH2 is the switch thickness. When the wrap is started, the wrap speed is performed the wrap wire speed command for the first stage. When the wrap thickness reaches WTH2, the wrap speed is performed the wrap wire speed command WSD2 for the second stage. When user want to disables the wrap wire speed command WSD2, the switch thickness WTH2 is set to be the wrap stop thickness WTHK. The wrap is stopped when the wrap thickness reaches the wrap stop thickness WTHK. For another wire speed control function, the inverter provides the same inverter command when the wrap speed is smaller than the switch thickness WTH2. The inverter command is the frequency corresponding to the wrap wire speed command for the second stage with switch thickness being achieved. When the wrap thickness is larger than the switch thickness, the inverter command is reduced as the thickness is increased. Therefore, the wire speed is increased as thickness when the wrap thickness is smaller than the switch thickness. The wire speed is constant when the wrap thickness is larger than the switch thickness.

The above-mentioned inverter command is calculated from wire speed based on the maximal operation frequency (Hz) of the rotation axis and rotation speed (rpm). When the rotation axis is driven by inverter, the maximal operation frequency, the motor pole number, the rotation shaft diameter and the maximal operation frequency can be calculate by formula (1). When the rotation axis is driven by servo drive, the maximal operation frequency, the rotation shaft diameter and the maximal operation frequency can be calculate by formula (2).

$$Hz(max) = \frac{LSPD \times WRMP}{D} \times K1 \qquad \text{Formula 1}$$

$$rpm(max) = \frac{LSPD}{D} \times K2 \qquad \text{Formula 2}$$

Where LSPD is wrap wire speed command (unit:m/min)
WRMP is pole number for inductor motor of rotation shaft (unit: pole)
D is the diameter of cylinder (unit: mm)
K1 is constant 2.6526
K2 is constant 318.3099

The rotation speed of the rotation shaft can be changed with above calculation and control for wire speed. When the wrap thickness is increased, the inverter 21 is controlled to have lower speed to maintain same wire dragging force and constant wire speed for the wire.

Figure 8:
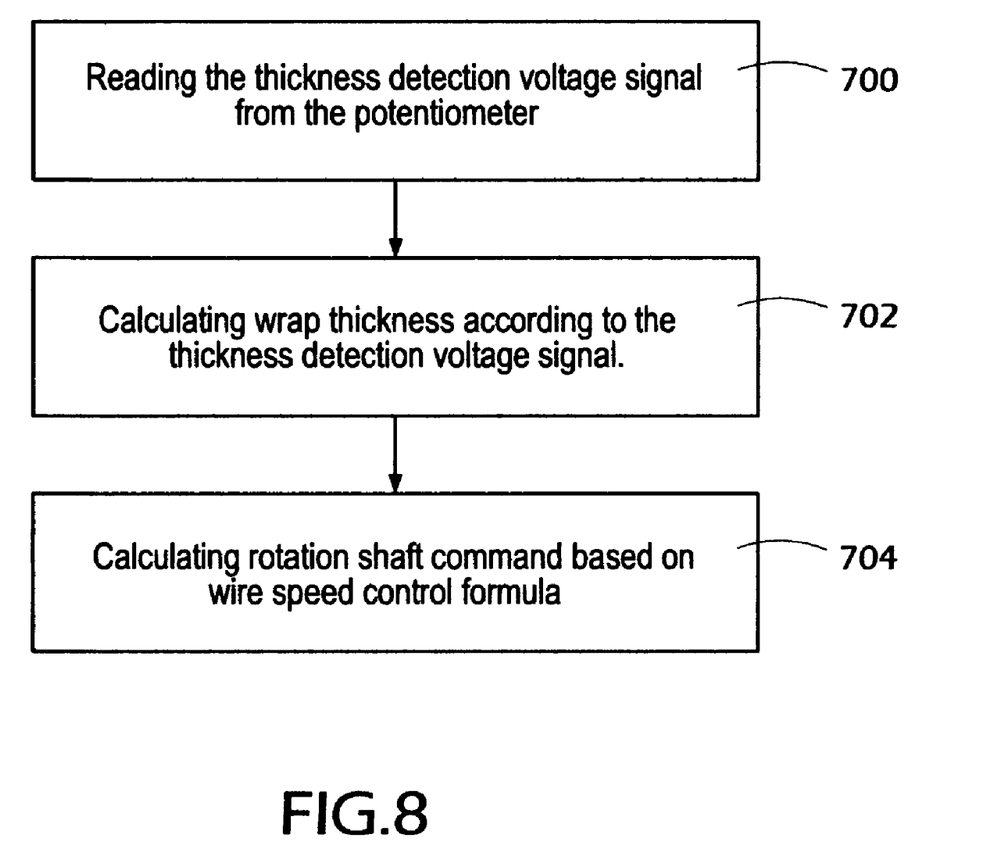
FIG. 8 shows the flowchart of wire speed command according to wrap thickness.

The above mentioned wire speed control step is calculated with wrap thickness. FIG. 8 shows the steps for the wire speed control. In step 700, the servo drive 32 reads the thickness detection voltage signal from the potentiometer 4. In step 702, the wrap thickness is calculated according to the thickness detection voltage signal. In step 704, the rotation shaft command is calculated based on wire speed control formula.

Figure 9:
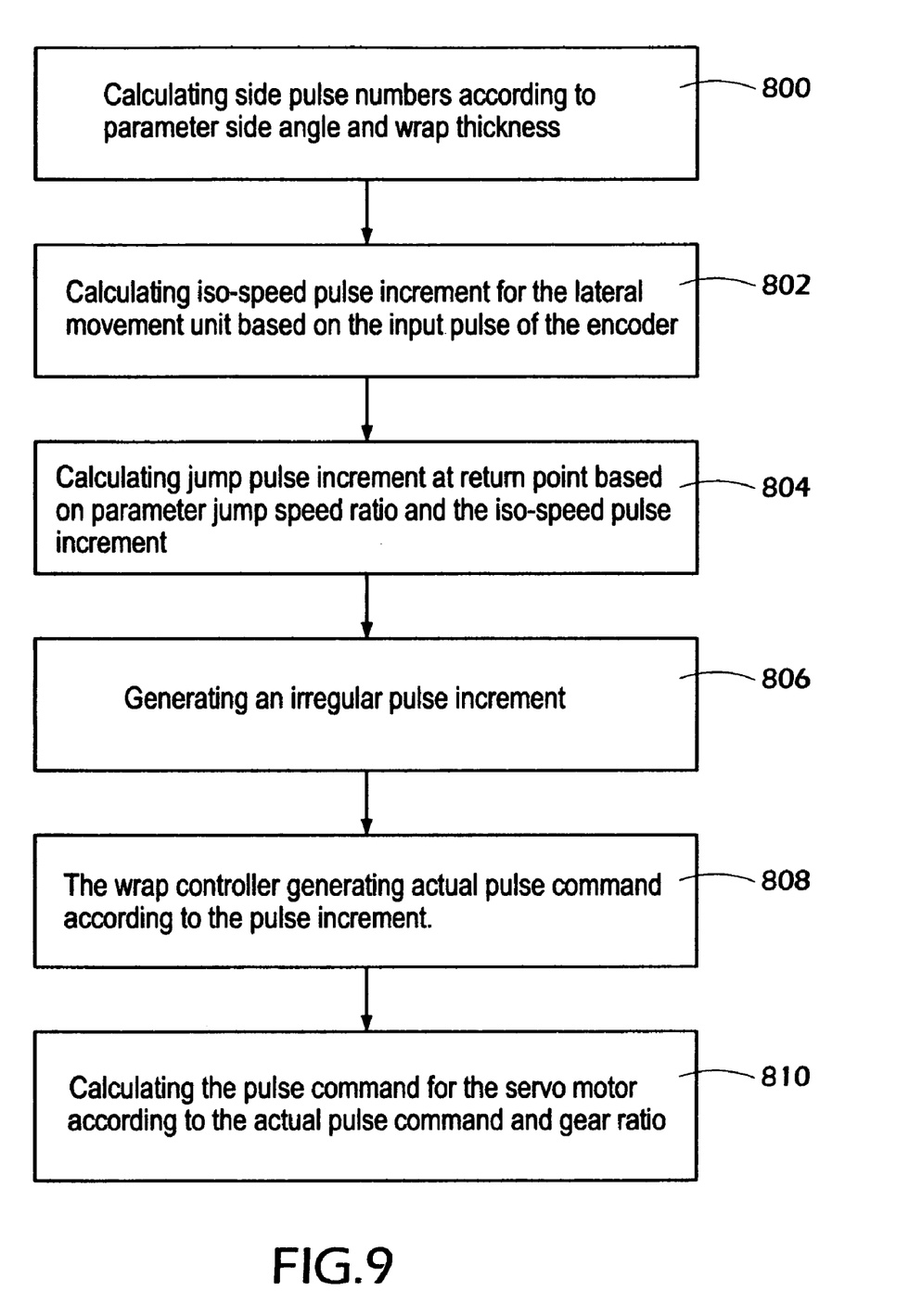
FIG. 9 shows the flowchart of wire positioning control according to parameter command.

The process for wrap position control according to parameter command is shown in FIG. 9. In step 800, the side pulse numbers are calculated according to parameter side angle and wrap thickness. In step 802, the iso-speed pulse increment for the lateral movement unit is calculated based on the input pulse of the encoder 23. In step 804, the jump pulse increment at return point is calculated based on parameter jump speed ratio and the iso-speed pulse increment. In step 806, an irregular pulse increment is generated. In step 808, the wrap controller generates actual pulse command according to the pulse increment. In step 810, the pulse command for the servo motor 31 is calculated according to the actual pulse command and gear ratio (formula 3).

$$\text{gear\_meeh} = \frac{WLNG}{cross \times WREP \times WSMD} \times K3 \qquad \text{Formula 3}$$

Where WLNG is the maximal wrap stroke (unit:mm)
Cross is wrap ratio
WREP is output resolution for rotation shaft encoder (unit pulse/rev)
WSMD is diameter of horizontal shaft transmission unit (unit:mm)
K3 is a constant 3184.71

FIGS. 10 to 13 show the control method of the for the servo drive with high speed wrapping function according to the present invention, where the parameter setting is used for various wraps patterns.

The drive status (STS) comprises potentiometer voltage, wrap wire speed command (m/min), wrap thickness (mm), wrap status such as wrap function start or stop, broken-wire detection, wrap stop condition and parameter setting, examining actual wrap wire length.

Figure 10:
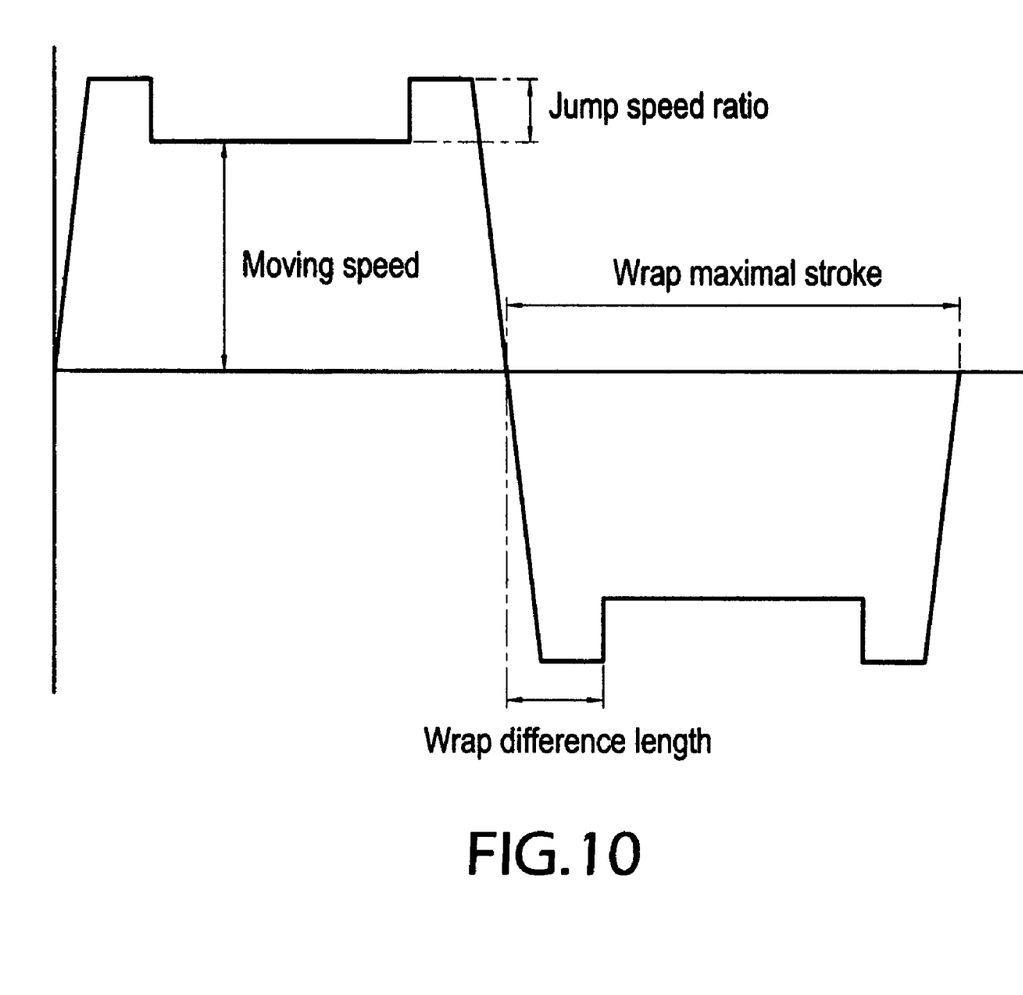
FIG. 10 shows the parametric function for wrap difference length.
Figure 11:
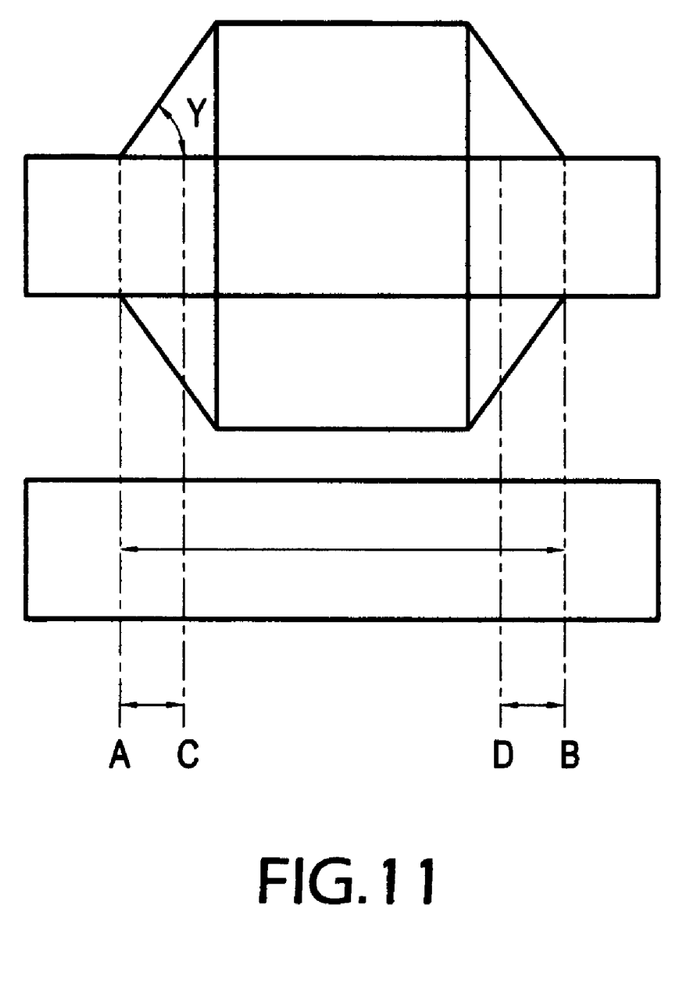
FIG. 11 shows the parametric function for wrap side angle.

As shown in FIG. 10, the wrap difference length (WFDL) is length AC and DB in stroke A-B. In the stroke A-B, the actual stroke is not from A to B and then from B to A. The actual stroke is from A to D, D to C, C to B and then B to A, thus solving the bumps on two sides during wrap.

The jump speed ratio (WJSR), as shown in FIG. 10, the move speed from returning point is increased. The jump speed is the product of jump speed ratio and move speed. The parameter is only effected when the wrap difference length (WFDL) is activated.

Wrap side angle (WTH1;WTH2), the including angle when the wire is packed up.

Wrap ratio (WCRI;WCRD), the turn number of inductor motor when the servo motor experiences a stroke from left to right, it is the cross over times of wires on cylinder when the servo motor 31 has a round trip.

Maximal wrap stroke (WLNG), the stoke between A-B,

Differential empty stroke ratio (WPER), about 80% percent of wrap process is wrap stroke and other wrap process is from A to B or from B to A, whereby the uneven wrap face can be solved. When the wrap difference length (WFDL) is activated, this parameter is effected.

The wrap wire speed of first stage (WSPD);

the wrap stop thickness (WTHK), the wrap is stopped when the wrap thickness reaches set value;

the wrap stop stroke (WSSK), the wrap is stopped when the wrap stroke is smaller than the set value;

the wrap stop turn (WSLL), the wrap is stopped when the wrap stop turn is more than set value;

wire diameter (WWDL), the diameter of wire.

Figure 12:
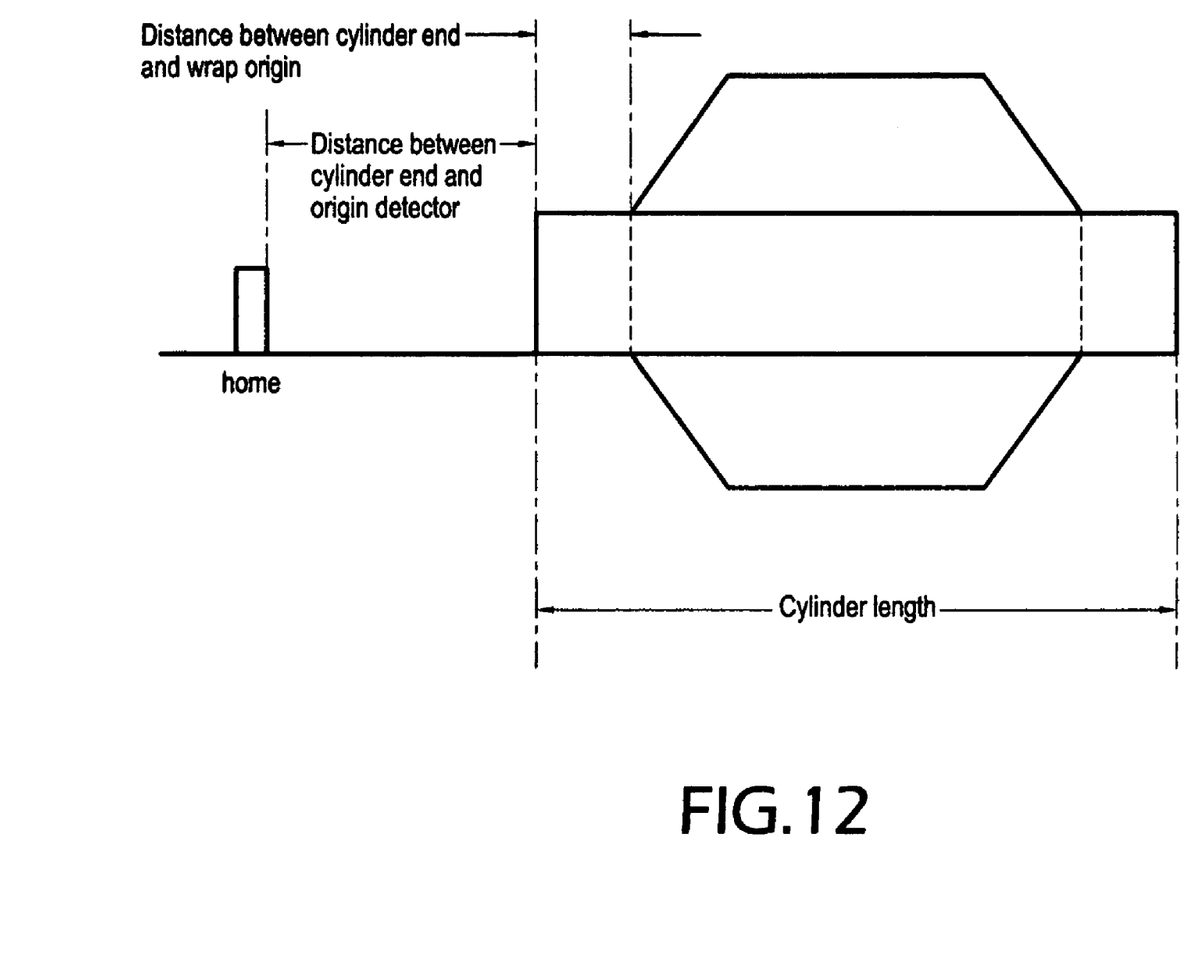
FIG. 12 shows the parametric function for origin detector and cylinder ends.

Distance between origin detector and cylinder end (WOS1), as shown in FIG. 12.

Distance between wrap initial point and cylinder end (WOS2);

the cylinder length (WOS3)

Wrap displacement speed (WPOV): set the displacement speed for the servo drive from origin detector to the wrap initial point.

Thickness voltage conversion ratio (WTVR): set the wrap thickness value verse the voltage of the potentiometer, which is used to convert the wrap thickness.

The maximal output voltage of potentiometer (WPMV)

The diameter of horizontal shaft transmission device (WSMD)

The output resolution of rotation shaft (WREP): the pulses number output by phase A and phase B of the encoder when the encoder has rotated one turn.

The pole number of rotation shaft motor (WRMP): The pole number should be set when the rotation shaft uses inductor motor, the pole number of rotation shaft motor is one when the servo drive is used.

The maximal operation frequency or rotation speed of rotation shaft (WRHS)

Wrap mode (WMOD)

Analog level smooth constant of potentiometer: low pass smooth filtering.

Wrap wire speed command of the second stage (WSD2).

Switch thickness (WTH2): the wrap wire speed is switched to the wrap wire speed command of the second stage (WSD2) when the wrap thickness reaches switch thickness setting.

Figure 13:
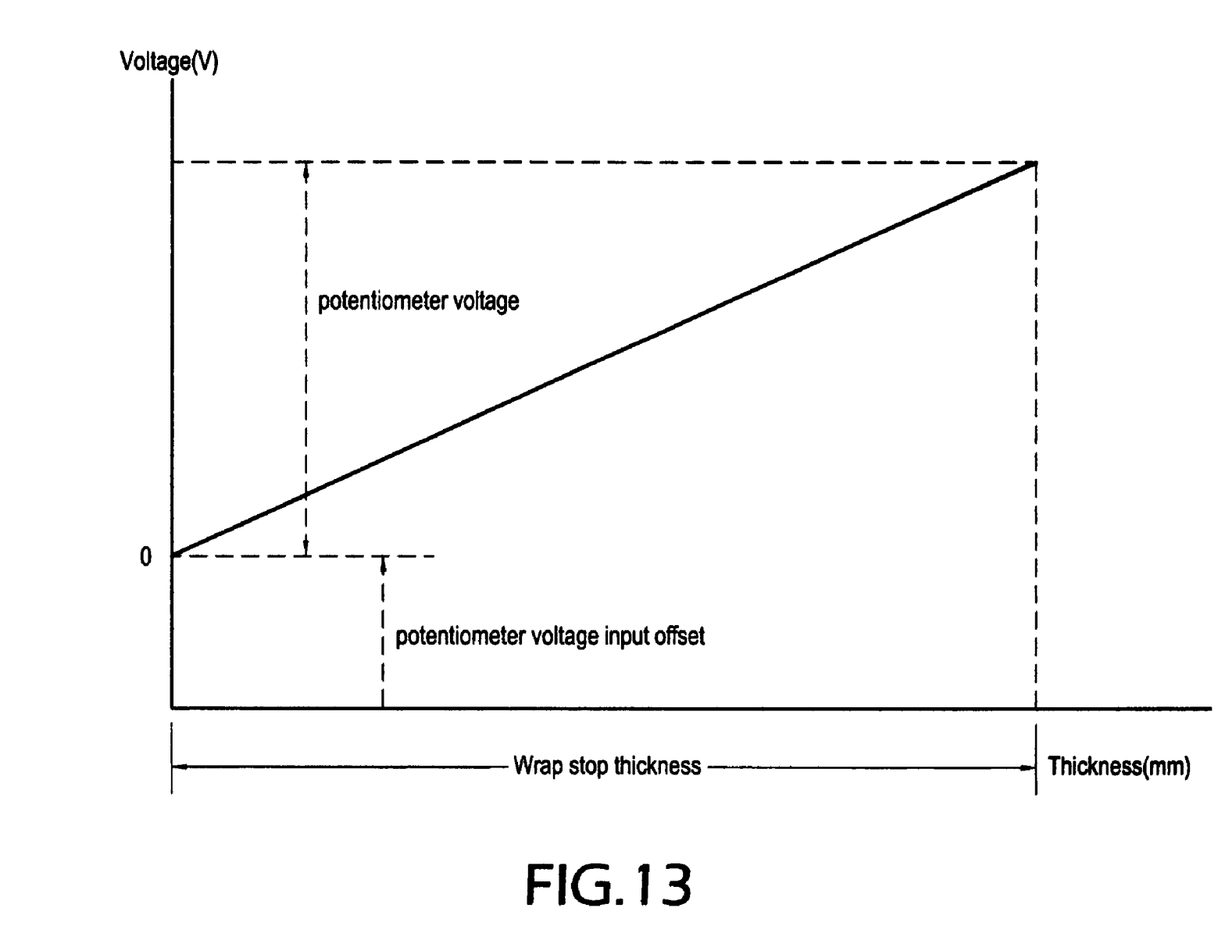
FIG. 13 shows the function of special parameter write-in for wrap.

Special parameter write-in for wrap (WFUN) includes (1) Zero thickness calibration for potentiometer, the wrap thickness is adjusted to 0 mm when the functioned is performed. (2) The potentiometer slope calibration (adjust thickness voltage conversion ratio), as shown in FIG. 13, the calculation formula is shown in formula 4.

Adjust thickness voltage conversion ratio=wrap stop thickness/potentiometer voltage    Formula 4:

The servo drive with high speed wrapping function according to the present invention uses the existing functions of the servo drive 32 and uses the application-specific wrap command processor 33 and the software thereof in the servo drive 32. The wrap way is realized with parameter setting and software to simplify hardware design. The movement command is not delay for high speed wrap forming procedure. The conventional control uses external signal of drive and has the limitation on input frequency.

Moreover, the function software can directly set the length parameter and wrap pattern through parameter setting in position control mode and no mechanical modification and mechanical structure change is involved. No try and error modification is needed. The parameter setting also provides wire speed control.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A servo drive with high speed wrapping function, which is used for a servo control device with a wire wrap controller, the servo device comprising:
   at least one wrapping mechanism;
   a rotation control unit for controlling rotation of the wrapping mechanism;
   a lateral motion control unit, including a servo motor and a servo drive for driving the servo motor, for controlling lateral reciprocating movement of the wrapping mechanism; and
   an origin detector for detecting a wrap origin,
   wherein the servo drive further comprises a wrap command processor and a software built in the wrap command processor for setting and calculating function parameter and outputting control command, and
   wherein the wrap command processor comprises:
   a signal converter for receiving the voltage level analog signal of the potentiometer;
   a first low-pass filter connected to the signal converter and outputting a voltage level digital signal;
   a pulse type selector for receiving pulse signal of the encoder;
   a counter connected to the wrap controller and outputting a counted signal; and
   a wrap controller connected to output end of the first low-pass filter and the counter and used for software computation on received signal, the wrap controller used with internal software and set parameter and the voltage level analog signal of the potentiometer and the pulse signals of encoder to calculate pulse commands of servo motor.

2. The servo drive as in claim 1, further comprising:
   a potentiometer connected to the wrapping mechanism for detecting wrap thickness and outputting a detection voltage signal as one input signal to the servo drive.

3. The servo drive as in claim 1, wherein the rotation control unit comprises:
   an induction motor;
   an encoder arranged on the induction motor and
   an inverter for driving the induction motor.

4. The servo drive as in claim 1, further comprising an upper-layer controller connected to the rotation control unit and the lateral motion control unit through interfaces of RS232 or RS485, the upper-layer controller used set control parameter and target, display control result and coordinate the operation and order of the servo drive.

5. The servo drive as in claim 1, further comprising a broken-wire detector to examine whether wrap wire is broken and generates a signal WSENSOR(DI) as one input signal of the servo drive.

6. A method for driving servo drive with high speed wrapping function, comprising:
   a parameter setting step, where the function parameters are set according to wrap pattern;
   an initial origin return step, where the servo drive receives an external activation signal and uses with the origin detector to detect wrap origin, a wrap origin return is performed to enter wrap function;
   a wrap thickness calculation step, where the servo drive reads the thickness detection voltage signal from the potentiometer to calculate the wrap thickness and wire speed control in wrap duration;
   a rotation control step for wrapping mechanism, where the servo drive calculates an inverter command based on above set parameters, wrap thickness and wire speed command, the inverter command is output to the inverter, whereby the inverter controls the induction motor to drive the wrapping mechanism;
   changing the rotation speed of the rotation shaft with above calculation and control for wire speed, when the wrap thickness is increased, the inverter is controlled to have lower speed to maintain same wire dragging force and constant wire speed for the wire, wherein the maximal operation frequency of the rotation shaft driven by the inverter is calculated based on wrap wire speed command (LSPD), pole number for inductor motor of rotation shaft (WRMP), diameter of cylinder (D) and a constant K1;
   a lateral movement control step for wrap mechanism, where the encoder generates a series of pulse signals to the wrapping command processor according to the rotation of the induction motor, the series of pulse signals used with the wrap parameters for pulse command calculation of the servo motor and the wrap positioning control, the servo motor having forward and backward rotation to move the wrapping mechanism between two ends of the cylinder; and
   a wrap stopping step, where the servo drive receives an external close signal (WSTOP) to stop the rotation control unit and the lateral motion control unit.

7. The method as in claim 6, further comprising:
   providing two-stage wrap wire speed command setting, wherein
   the wrap speed is set by wrap wire speed command for the first stage at beginning;
   the wrap speed is switch to wrap wire speed command for the second stage by inverter command when the wrap thickness reaches a switch thickness.

8. The method as in claim 7, further comprising:
   setting the switch thickness equal to the wrap stop thickness to disable the wrap wire speed command for the second stage;
   the wrap speed being setting by wrap wire speed command for the first stage at beginning and then being stopped when the thickness reaches set wrap thickness.

9. The method as in claim 6, wherein the maximal rotation speed of the rotation shaft driven by the servo drive is determined by wrap wire speed command, diameter of cylinder (D) and a constant K2.

10. The method as in claim 6, wherein the wrap thickness calculation step further comprises:
    the servo drive reading the thickness detection voltage signal from the potentiometer;
    the wrap thickness being calculated according to the thickness detection voltage signal; and
    the rotation shaft command being calculated based on wire speed control formula.

11. The method as in claim 6, wherein the step for wrap position control according to parameter command comprises:
    the side pulse numbers being calculated according to parameter side angle and wrap thickness;
    the iso-speed pulse increment for the lateral movement unit being calculated based on the input pulse of the encoder;
    the jump pulse increment at return point being calculated based on parameter jump speed ratio and the iso-speed pulse increment;
    generating an irregular pulse increment;
    the wrap controller generating actual pulse command according to the pulse increment; and
    the pulse command for the servo motor being calculated according to the actual pulse command and gear ratio.

12. The method as in claim 11, wherein the pulse command for the servo motor is calculated according to the actual pulse command and gear ratio and is calculated according to maximal wrap stroke (WLNG), wrap ratio (cross), output resolution for rotation shaft encoder (WREP), diameter of horizontal shaft transmission unit (WSMD) and a constant K3.

13. A servo drive with high speed wrapping function, which is used for a servo control device with a wire wrap controller, the servo device comprising:
    at least one wrapping mechanism;
    a rotation control unit for controlling rotation of the wrapping mechanism;
    a lateral motion control unit for controlling lateral reciprocating movement of the wrapping mechanism;
    an origin detector for detecting a wrap origin; and
    an upper-layer controller connected to the rotation control unit and the lateral motion control unit through interfaces of RS232 or RS485, the upper-layer controller used set control parameter and target, display control result and coordinate the operation and order of the servo drive.

* * * * *